(12) United States Patent
Raji

(10) Patent No.: US 6,868,160 B1
(45) Date of Patent: Mar. 15, 2005

(54) SYSTEM AND METHOD FOR PROVIDING SECURE SHARING OF ELECTRONIC DATA

(75) Inventor: Alexander David Raji, Atlanta, GA (US)

(73) Assignee: BellSouth Intellectual Property Corporation, Wilmington, DE (US)

(*) Notice: Subject to any disclaimer, the term of this patent is extended or adjusted under 35 U.S.C. 154(b) by 0 days.

(21) Appl. No.: 09/435,771

(22) Filed: Nov. 8, 1999

(51) Int. Cl.[7] .............................. H04L 9/08; H04L 9/30
(52) U.S. Cl. ..................... 380/30; 380/277; 380/282; 380/285
(58) Field of Search ..................... 380/30, 28, 277, 380/283, 285, 282, 279; 713/200, 201

(56) References Cited

U.S. PATENT DOCUMENTS

| | | | |
|---|---|---|---|
| 4,405,829 A | * 9/1983 | Rivest et al. | 380/30 |
| 5,150,411 A | * 9/1992 | Maurer | 380/30 |
| 6,151,676 A | * 11/2000 | Cuccia et al. | 713/176 |
| 6,154,543 A | * 11/2000 | Baltzley | 380/255 |
| 6,263,446 B1 | * 7/2001 | Kausik et al. | 713/201 |

OTHER PUBLICATIONS

Ronald L. Rivest, "The MD5 Message–Digest Algorithm" (Apr. 1992).
Federal Information Processing Standards Publication 46–2, "Data Encryption Standard (DES)" (Dec. 30, 1993).
Federal Information Processing Standards Publication 171, "Key Management Using ANSI X9.17" (Apr. 27, 1992).

* cited by examiner

*Primary Examiner*—Matthew Smithers
(74) *Attorney, Agent, or Firm*—Myers Bigel Sibley & Sajovec, P.A.

(57) ABSTRACT

A system and method for secure sharing of electronic information uses public key encryption in which a key generator algorithmically generates public-private key pairs without requiring storage, maintenance, tracking and management of keys or certificates. The algorithm uses one or more unique attributes of an individual to generate the public private key pair for that individual. In a preferred embodiment, the one or more unique attributes are input to a random number generator which outputs random numbers used to generate the public-private key pairs that are used for secure communication.

32 Claims, 6 Drawing Sheets

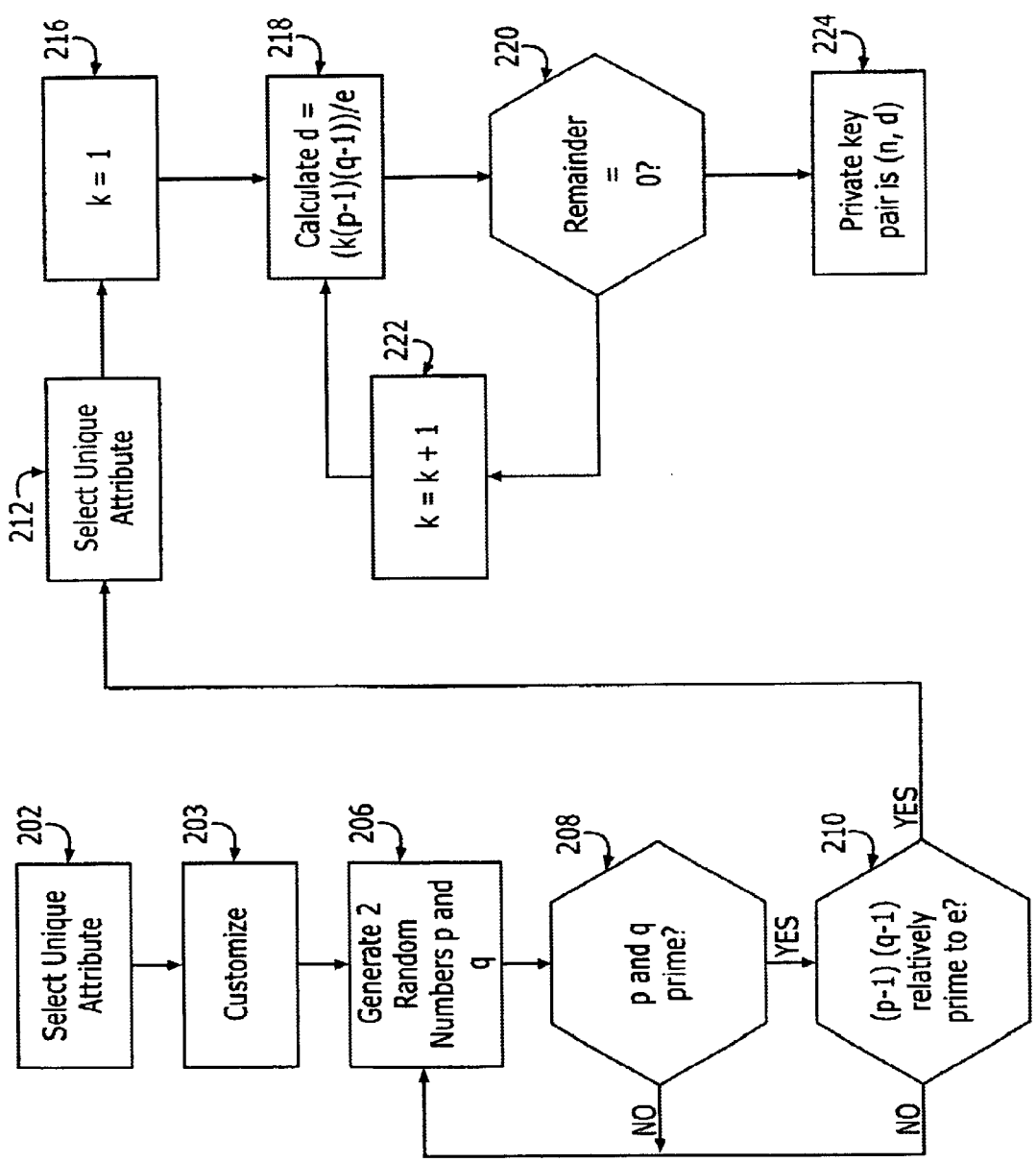

SYSTEM AND METHOD FOR PROVIDING SECURE SHARING OF ELECTRONIC DATA

BACKGROUND

1. Field of the Invention

The present invention relates to secure storage and sharing of electronic information. More particularly, the present invention provides a system and method for generating public and private keys based on a unique attribute of an individual, without requiring management, storage, maintenance and tracking of the public and private keys or key certificates by a conventional third party certificate authority.

2. Background of the Invention

Oftentimes people need to send menages or other electronic data in a secure manner. Such security is generally provided through the use of encryption. That is, rather than transmit a message in its plain text form, an encrypted version of the message is sent. Conventional encryption schemes encrypt on the basis of a key. Without the proper key to decrypt the message, the recipient sees only an unintelligible or a garbled message, which cannot be easily read.

A wide variety of encryption schemes have been developed and employed throughout history. One popular modern scheme is known as public key encryption. In public key encryption, a public-private key pair is created. When the sender desires to send a secure message to a recipient, the sender encrypts the message with the recipient's public key. Upon receiving the message, the recipient decrypts it using the recipient's private key.

The use of the public-private key pair can also be used to authenticate messages. Authentication assures the recipient that the sender is actually the person who sent the message. To authenticate a message, the sender encrypts a short message, known as a digital signature using the sender's private key. When the recipient receives the digital signature, the recipient decrypts it using the sender's public key. Since only the public key corresponding to the sender's private key can successfully decrypt the message, the message is authentic, i.e., sent by the sender, if the decryption produces the original short message.

One common form of public key encryption used conventionally is the RSA algorithm, developed by Rivest, Shamir and Adelman in 1978. The algorithm is described in U.S. Pat. No. 4,405,829, which is hereby incorporated by reference in its entirety. Briefly, in the RSA algorithm the product of two large primes, p and q, is computed as:

$$n=pq. \qquad (1)$$

"n" is called the modulus. A number e is chosen (less than n) which is relatively prime to the product of (p−1) and (q−1). Two quantities are relatively prime if they have no common factors except 1. Another number d is then found such that the quantity (de−1) is divisible by the product (p−1)(q−1). This is done by finding an integral value k (k=1, 2, 3, ...), such that:

$$d=(k(p-1)(q-1)+1)/e \qquad (2)$$

has a remainder of zero (0).

The values e and d are called the public and private exponents respectively. The public key is the pair (n, e) and the private key is the pair (n, d). As explained below, the encryption algorithm requires computing the eth power of certain values. Due to the computational complexity of raising values to a power, e is often chosen to be 3. The factors p and q can be kept with the private key or destroyed. The security of RSA is premised on the assumption that factoring n into p and q is difficult, i.e., it would take an unreasonably long time to factor n into p and q.

To send a message, the sender encrypts the plain text message, m, to create a ciphertext (encrypted) message, c using the recipient's public key. For example, in RSA:

$$c=m^e \bmod n. \qquad (3)$$

The encrypted message c is sent to the recipient. To decrypt the message, i.e., recover the plain text message, m, from the ciphertext message, c, the recipient uses the private key (n, d). For example, in RSA:

$$m=c^d \bmod n. \qquad (4)$$

To authenticate a message, the sender sends the encrypted digital signature, based on a message, m as:

$$s=m^d \bmod n. \qquad (5)$$

The recipient then checks the authenticity of the message by calculating:

$$m=s^e \bmod n. \qquad (6)$$

If the result is the original message m, then the message received by the recipient is authentic.

To ensure security the private key must be kept secret. The public key, however, must be distributed to anyone the sender desires to send secure messages to or digitally authenticate messages for. A significant problem with public key encryption is the distribution, maintenance and tracking of the public keys.

To handle these tasks, a public key infrastructure was established. At the center of the public key infrastructure is a hierarchy of one or more certificate authorities. Generally, a certificate authority creates digitally signed public-private key pairs (i.e., certificates). The private key is sent by a certificate to the party making the request for the public-private key pair. The private key is generally sent by U.S. mail or by some other very secure delivery. The private key is generally sent on a certificate which ensures the private key's authenticity. The certificate authority stores the public key in a database. The public key database is maintained by the certificate authority.

A sender desiring to send a message in a secure fashion to a recipient requests the recipient's public key certificate from the recipient or the certificate authority. The recipient or the certificate authority sends the sender a certificate containing the recipient's public key. Conventionally, the certificate is sent electronically, for example, by email. Using the recipient's key, the sender encrypts the message. The sender then sends the encrypted message to the recipient. When the recipient receives the message, the recipient decrypts the message using the recipient's private key.

There are several significant problems associated with certificate authorities and the conventional public key infrastructure (PKI). One is that currently there are no standards or regulations governing certificate authorities. Thus, anyone can form a certificate authority. Consequently, the quality of the services offered by different certificate authorities can range from excellent to poor. Poor quality of service by a certificate authority is likely to result in a greater occurrence of security breaches due to the mishandling of public-private key pair information.

In addition, certificate authorities must track an ever-increasing volume of public-private key pairs that may be needed. As more and more data transmission are encrypted, more and more key pairs will have to be created, stored and tracked. If there is a problem with one of these keys, a new key pair will have to be generated, stored and tracked.

Large volumes of key management tasks could overwhelm a particular certificate authority resulting in security breaches or inability to handle the demand for public keys. This could prevent senders from being able to send messages securely, or prevent recipients from authenticating messages they receive. Another problem is that of distributing the keys and/or key certificates to those that need them. With many users, this task can become unmanageable.

Another problem with the conventional public key infrastructure is that public keys are generated randomly. Therefore, a trusted third party, often a certificate authority, must issue certificates to individuals, essentially binding a person's identity to a particular public key.

In addition, each person's public and private key (or certificate) is stored on a computer that is subject to destruction, theft or compromise. Further, the use of a certificate only guarantees station-to-station authentication. Current certificate technology does not guarantee that communication is occurring with the owner of the certificate. Thus, someone else can use the computer on which the certificate is stored, and carry on a secure communication with an unwitting other party.

In addition, parties that wish to communicate with a person must have prior knowledge of that person's public key. Currently, however, no public key directory exists to which a sender can refer to obtain an individual's public key. This restricts the free flow of secure communication. In addition, parties that wish to repeatedly communicate with a particular person or persons must maintain a directory of public keys associated with those individuals. Such directories are conventionally referred to as key rings. These public keys occasionally expire and/or require updating and maintenance.

Another problem is that the certificate authority must keep track of all certificates it issues so that it can recover from situations in which an issued certificate is compromised. This is a significant and cumbersome task which can become overwhelming as the demand for public-private key pairs increases. In conjunction with the magnitude of the tracking problem, the certificate authority must maintain a revocation list of revoked certificates. This list must be consulted before an individual uses a particular certificate to send a secure communication. Revocation lists maintained by the certificate authority work at odds with personally maintained key rings. That is, it is difficult for a person to know if a particular certificate has been revoked without checking the revocation list each time a secure communication is desired. Further, keeping the revocation list current becomes a daunting task as the user of public key encryption increases.

Given these problems with conventional certificate authorities, there is a need for a secure, reliable system for creating and distributing public-private key pairs in an efficient manner.

SUMMARY OF THE INVENTION

The present invention overcomes the problems in the art by greatly reducing, if not eliminating, the requirement for key and certificate management, maintenance, tracking and distribution. According to the present invention, the public-private key pair is algorithmically generated in a key generator executing on a secure message server using a unique attribute of each individual for whom a public private key pair is generated. In a preferred embodiment, the unique attribute is one for which a database already exists. For example, the person's telephone number can be used to generate the public-private key pair. Databases of telephone numbers already exist, and are maintained by telephone companies. Given a person's identity, their telephone number can be easily retrieved from the database. Thus, few or no structural change to existing databases are required to implement the present invention. Other already existing databases can be used. For example, email address, credit card numbers, bank account numbers and driver's license numbers offer other sources of unique identification numbers for the creation of public-private key pairs.

The keys are generated algorithmically in the following manner. Two prime numbers, p and q, of an appropriate size are chosen. The prime numbers, p and q, are generated in a random fashion based on a personal attribute of the person for whom the public-private key pair is generated. The prime numbers, p and q, are multiplied together to form the modulus, n. (Equation (1) above.) The values of d and e are determined from the prime numbers p and q. The value of e is chosen less than n, such that e and the quantity $(p-1)(q-1)$ are relatively prime. Given the value of e, d is easily calculated as $d=(k(p-1)(q-1)+1)/e$. (Equation (2) above.)

In a preferred embodiment of the invention, the numbers p and q are also customized to the particular individual for whom they are created. This can be accomplished by inserting a secret message—such as a personal identification number (PIN) or password—in the number entered to produce the seed value for the random number generator as described below. Other personal data can be inserted either directly or after processing by some randomizing function (e.g., a hashing function). In a preferred embodiment, the known attribute is combined with a secret string, known only to the key generator, to create the seed. This secret string increases the security of the system.

To encrypt messages, the sender communicates with the secure message server to obtain the recipient's public key. A key generator uses the algorithm described above to generate the recipient's public key. The one or more input attributes about the recipient are determined from recipient identification information sent by the sender to the secure message server, to generate the recipient's public key. The secure message server sends the generated public key to the sender. Using the recipient's public key, the sender encrypts the message and sends the encrypted message to the recipient. Upon receiving the encrypted message, the recipient uses his or her private key to decrypt the message. Although the recipient could obtain his or her private key from the secure message server using the personal PIN or password when required, for increased security the private key can be sent to the recipient via U.S. mail or other very secure delivery prior to the recipient's beginning secure communications.

To authenticate messages, the sender sends a short message, known as a digital signature, which the sender encrypts using his or her private key. Although the sender could obtain his or her private key from the secure message server when required, for increased security the private key is sent to the sender via U.S. mail or other very secure delivery prior to the recipient's beginning secure communications. Upon receipt of the message, the recipient communicates with the secure message server to obtain the sender's public key. The key generator uses an algorithm that generates the sender's public key using one or more unique attributes about the sender, determined from sender identification information sent by the recipient to the secure message server. The secure message server sends the generated public key to the recipient. Using the sender's public key, the recipient decrypts the digital signature. If the result is the correct unencrypted digital signature, then the message is authentic.

Thus, it is an object of the present invention to provide a system and method for securely sharing electronic information between parties.

It is another object of the present invention to provide a system and method for obtaining and using the public key belonging to a particular person on demand.

It is another object of the present invention to eliminate the need for a public key infrastructure, certificates and certificate distribution.

It is another object of the present invention to provide a system and method for replacing lost keys without having to maintain copies of issued keys and without having to issue a completely new key.

These and other objects of the present invention are described in greater detail in the detailed description of the invention, the appended drawings and the attached claims.

BRIEF DESCRIPTION OF THE DRAWINGS

FIG. 2D is a flow chart for deriving a private key according to a second preferred embodiment of the present invention.

DETAILED DESCRIPTION OF THE INVENTION

Figure 1:
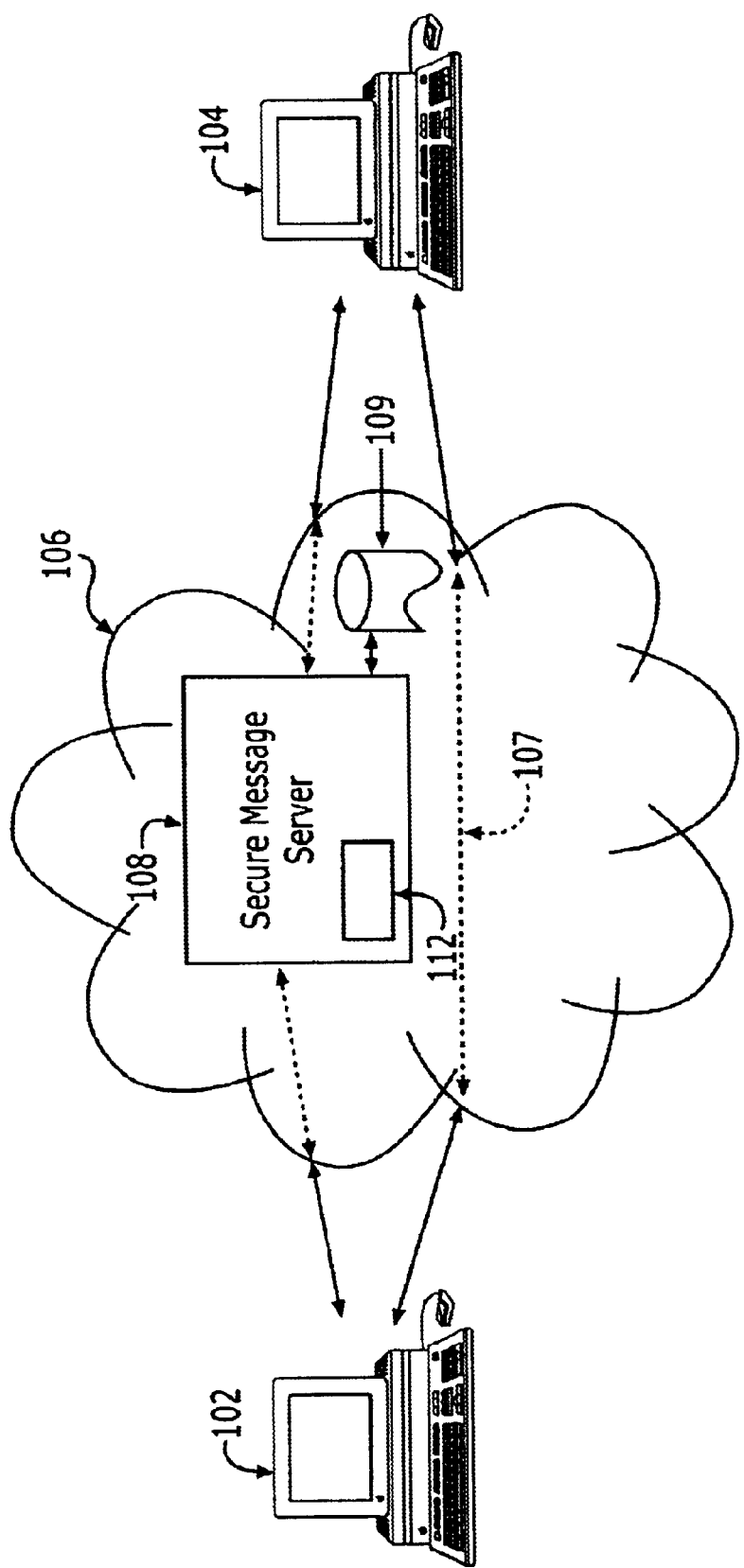
FIG. 1 illustrates schematically a system for public-private key generation according to a preferred embodiment of the present invention.

In a preferred embodiment of the present invention shown schematically in FIG. 1, a sender using a computer 102 send a secure message to a recipient, using a computer 104. Preferably the message is sent across a computer network 106 along a logical path 107. Computer network 106 is represented by convention as a cloud. Computer network 106 can be any computer network, including but not limited to, the Internet, wide-area networks, local-area networks and intranets. The message can be any kind of data message including, but not limited to: email, facsimile, voice, video, audio and any combination of these messages.

Using computer 102, the sender enters the message to be sent in plain text, i.e., in an unencrypted form. The sender next encrypts the message prior to sending it to the recipient. To encrypt the message, the sender first obtains the recipient's public key. In the preferred embodiment of the present invention, the sender obtains the recipient's public key in response to a key generation request the sender sends to a secure message server 108. Unlike conventional certificate authorities, secure message server 108 does not maintain a database of public keys. Rather, secure message server 108 algorithmically determines the correct public key based on a unique characteristic of the recipient. The algorithm is described in detail below.

Secure message server 108 requires the recipient's identity to determine the appropriate public key. As would be apparent to those skilled in the art, there are many ways to send this information to secure message server 108. The simplest is to just send the recipient's name to secure message server 108 as part of the request message for the public key. In another embodiment of the present invention, the recipient's email address and/or telephone number are send to secure server 108 to identity the recipient. Further, the recipient's identity can be sent to secure message server 108 in a secure fashion using any encryption technique.

Secure message server 108 receives the identity of the recipient and inputs it to key generator 112. Using one or more unique attributes related to the recipient (based on the recipient's identity), key generator 112 algorithmically determines the public key corresponding to the recipient's private key. Secure message server 108 sends the recipient's public key to the sender. If desired, this communication can be performed in a secure fashion as well.

Using the public key obtained from secure message server 108, the sender then encrypts the message. The encryption is preferably performed according to the RSA algorithm described above. Once the message is encrypted, the message is sent to the recipient.

The recipient decrypts the message using the recipient's private key. The present invention allows the recipient to send a key generation request to secure message server 108 to obtain his or her private key. The recipient must include his or her identity in the request. The identification information is as described above. Using one or more unique attributes of the recipient related to the recipient's identity (such as PIN or password—described below), key generator 112 determines the recipient's private key. In this embodiment of the present invention, secure server 108 preferably sends the recipient's private key in a secure manner. However, in the preferred embodiment of the present invention, the recipient has already received his or her private key from secure message server 108. The key is preferably sent by secure message server 108 using U.S. mail, rather than email. To decrypt the message, the recipient applies his or her private key to the encrypted message.

Figure 2A:
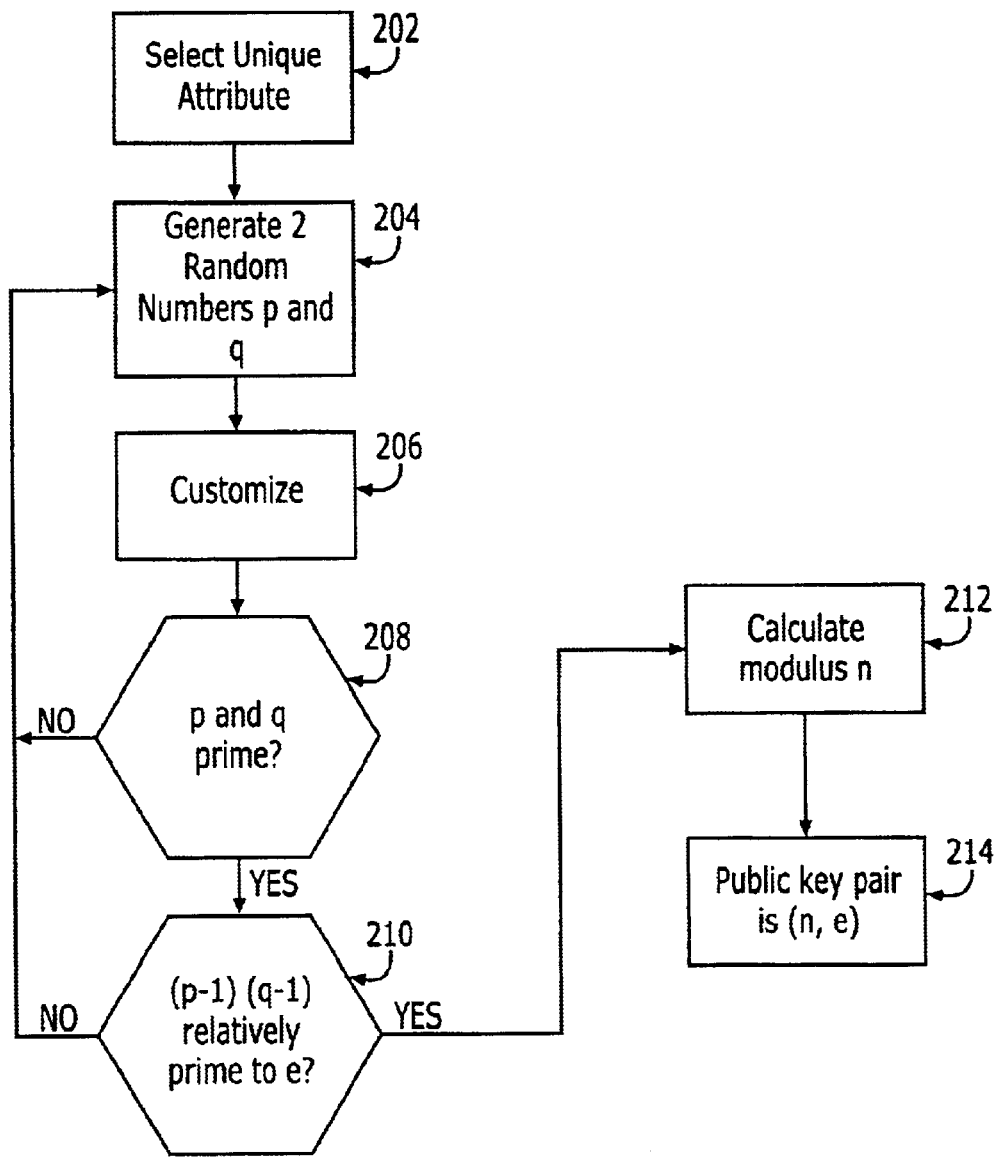
FIG. 2A is a flow chart for deriving a public key according to a first preferred embodiment of the present invention.
Figure 2B:
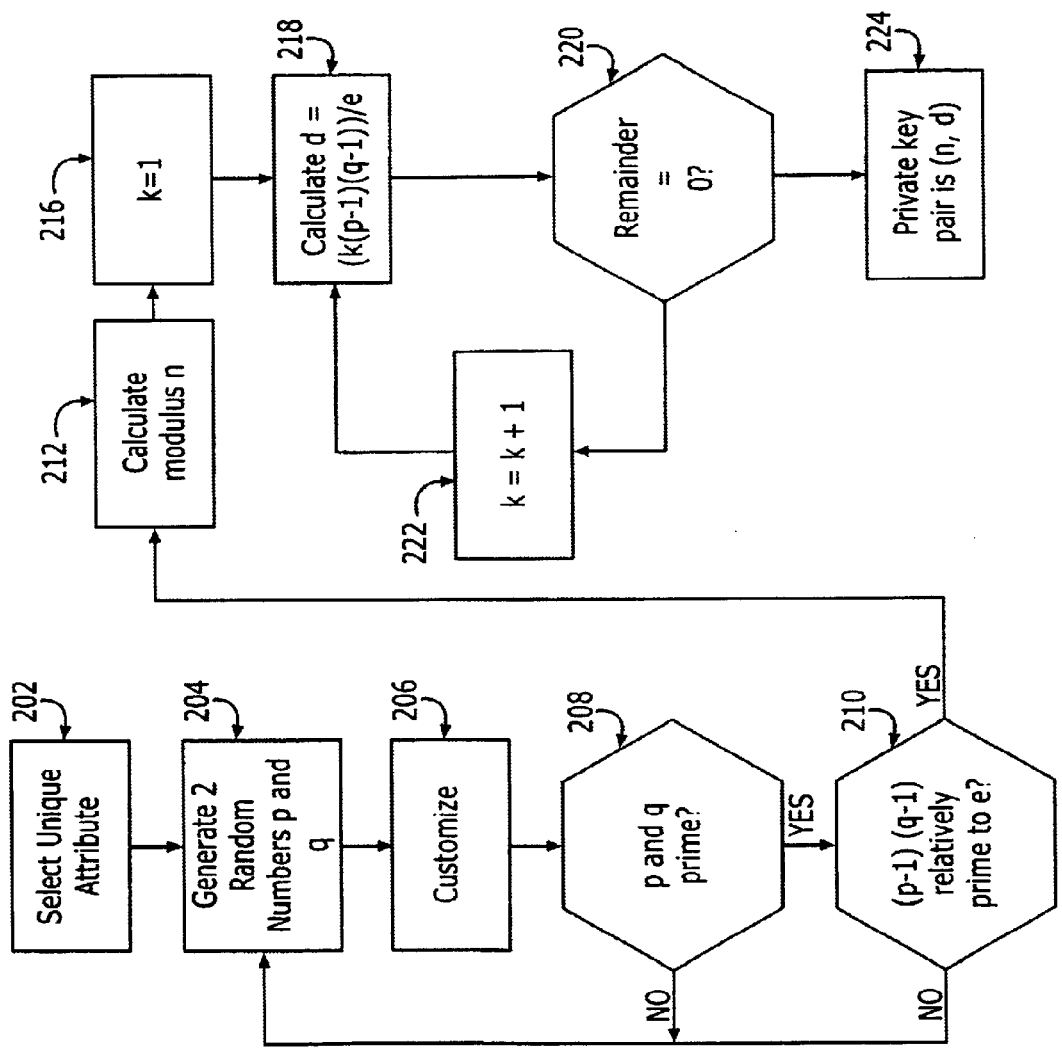
FIG. 2B is a flow chart for deriving a private key according to a first preferred embodiment of the present invention.

An algorithm for determining the public and private keys required for secure communication according to a preferred embodiment of the prevent invention is described in FIGS. 2A and 2B. FIG. 2A illustrates generation of the public key pair (n, e) according to a preferred embodiment of the present invention. FIG. 2B illustrates generation of the private key pair (n, d) according to a preferred embodiment of the present invention.

Preferably, key generator 112 executes the algorithm to generate the recipient's private key. In the preferred embodiment of the present invention, key generator 112 is a computer program executing on a computer, such as secure message server 108. Such a computer is well-known in the art, and the requirements for such a computer would be apparent to those skilled in the art. It would also be apparent to those skilled in the art that key generator 112 can be implemented in hardware based on the description contained herein.

Referring first to FIG. 2A, a first preferred embodiment of the algorithm is described. Beginning in step 202, one or more unique attributes of an individual are selected. Preferably, the information to be used to determine the one or more unique attributes is selected prior to requesting public-private key pairs. For example, it would be determined that the unique attribute(s) is an individual's phone number, account number, credit card number, mailing address, email address, etc. or any combination of these prior to requesting public-private key pairs. Then, upon receiving a public or private key generation requests, secure message server 108 knows what data to use as the unique attribute.

The unique attribute can be a phone number, a credit card number, or any other number that can uniquely identify an individual or entity desiring to carry on secure communication. The unique attribute is related to the identity of the individual for whom the private key pair is generated.

The one or more unique attributes can be sent explicitly in a key generation request or derived from information sent to secure message server 108. Information which can be sent expressly in the key generation request includes, for example, the recipient's name, telephone number or email address. Alternatively, the identification information, including for example, the recipient's name telephone number or email address, can be used to perform a search of a database, such as database 109, to obtain other information regarding the recipient that can be used as the unique attribute, including for example, the recipient's account number or mailing address. Further, a combination of explicit and derived information can be used as the unique attribute.

Where the actual attribute chosen does not provide absolute identity, such as a phone number, which may be used by a number of individuals (for example a home phone number), the key generation can be customized as described below. Note that this customization can be performed even where the chosen number is unique to provide additional security.

The algorithm continues in step 204 where key generator 112 generates two random numbers p and q. The random numbers are generated using the unique attribute as a seed value to the random number generator. In the preferred embodiment, the random number generator is a hashing algorithm based on message-digest 5 (MD5), described below. Although it would be apparent to those skilled in the art that other methods for generating random numbers can be used, it is important that the random number generator generates the same sequence of random numbers for a particular seed value. Although p and q can be any size, i.e., can be represented by any arbitrary number of bits, it is preferable that they be chosen to be relatively large. The larger the numbers p and q, the more secure the encryption. This is because factoring the modulus n is more difficult with larger p and q. However, encryption and decryption are more computationally intensive with larger values for p and q. In a preferred embodiment of the present, p and q are at least 512 bits.

Key generator 112 continues in step 206 in which customization of the randomly selected values p and q can be performed. There are a variety of ways in which the values of p and q can be customized. In addition, the customizations described below can be performed on one or both of the values of p and q.

In one customization, the recipient selects a PIN number. This PIN number can be an arbitrary number of bits. For example, 16 or 32 bits might be appropriate for a 4-digit PIN number. The length of the PIN number can vary depending on the particular computing platform on which the key generator is executing, and the number of digits in the PIN number.

One way of customizing p and/or q is to substitute the binary digits that make up the PIN number for a subset of the bits that make up p and q. For example, if the PIN is 32 bits long, then the high-order 32-bits of p and/or q are substituted with the bits corresponding to the PIN number. In fact, any subset of the binary representation of p and q can be substituted with the binary digits of the PIN number.

In a second form of customization, the recipient selects a password. The binary representation of the password is used to substitute a subset of the binary digits of p and/or q in the same manner as described above for the substitution using the binary digits of the PIN number. Alternatively, if system access is password restricted, the system can use the recipient's system login password to obtain his or her private key to decrypt messages.

In addition to substitution as described above, the bits from either the PIN number or password can be appended to the randomly generated values of p and/or q. In this case, however, it is preferable to generate smaller p and/or q values to begin with. Preferably, the bits are appended as the high-order bits, but they can be appended anywhere in the p and/or q binary representation so long as p and q meet the primality criteria described below. For example, if it is desired that p and q be 512-bit numbers and the PIN or password is 32 bits, then p and q are generated as 480 bit numbers with the other 32 bits appended from the PIN or password.

Step 206 is optional. That is, customization does not have to be performed to derive the benefits of the present invention in terms of eliminating the problems associated with conventional key or certificate management, maintenance, tracking and distribution. Customization simply provides an additional level of security and/or uniqueness for the key generation process. Where no customization is required, key generator 112 continues with step 208, rather than step 206.

Key generator 112 continues in step 208 where it determines if both p and q are prime numbers. P and q must be prime numbers to make the security as strong as possible, i.e., reduce to as much as possible the likelihood of factoring the modulus, n, into it factors, p and q. The determination for primality in step 208 is well-known in the art. Techniques for determining primality are discussed, for example, in Parts II and III of the discussions on websites http://www.utm.edu/research/primes/prove2.html and http://www.utm.edu/research/primes/prove3.html (and the references cited therein listed at http://www.utm.edu/research/primes/refs.shtml) (a copy of which is included at Appendix A), the discussion on website http://www.math.sci.kun.nl/math/~bosma/nuth/prit.html (and the references cited therein) (a copy of which is included at Appendix B) and the discussion at website http://www.rsa.com/rsalabs/faq/html/2-5-1.html (and the references cited therein, listed at http://www.rsa.com/rsalabs/faq/html/references.html) (a copy of which is included at Appendix C), each of which (including references cited therein and references listed on the included reference lists) is incorporated by reference herein in its entirety.

If either p or q is not prime, key generator 112 continues in step 204 where new values for p and q are randomly selected. In a preferred embodiment, the previous values of p and/or q are stored in memory if they are determined not to be prime. Then in step 208, if the new value of p and/or q matches one of the previously stored numbers (known non-prime numbers), the new value is not used. Thus, more computationally intensive methods for determining prime numbers an be avoided. The numbers can also be stored in a non-volatile memory, so that these known non-prime numbers are stored even when secure server 108 is turned off. This can also increase the efficiency of determining valid values of p and q, as the invalid values are always known.

In addition, if only one of p and q is determined not to be prime, then only the value for that p or q needs to be selected again. By only selecting the value that was determined to be non-prime the time required to select appropriate random numbers is reduced.

Once prime values for p and q are randomly selected, key generator 112 continues in step 210 where it determines if the value of the quantity $(p-1)(q-1)$ is relatively prime to the public key exponent, e. In some cases, for example, when e is chosen to be 3, this test reduces to a determination of whether the quantity $(p-1)(q-1)$ is evenly divisible by e. A number is evenly divisible by another number if the result of the division yields a remainder of zero (0). In such cases, a further simplification results by determining whether both $(p-1)$ and $(q-1)$ are divisible by e. If the quantity $(p-1)(q-1)$ is not relatively prime to e, then key generator 112 continues in step 204 by selecting new values of p and q. Where only $(p-1)$ or $(q-1)$ need be tested and only one of $(p-1)$ and $(q-1)$ fails the test, key generator 112 need only determine a new value for the value of p or q that failed the test. As described, above, the values, of p and/or q that causes the test to fail can be stored in a table in invalid values to increase efficiency in key generation.

If the quantity $(p-1)(q-1)$ is relatively prime to the value of e, then key generator 112 continues in step 212, where it calculates the value of the modulus n. The modulus n is equal to the product of p and q. Note that n can be calculated at any time after the values of p and q are determined. The public key is then determined as the pair (n, e) as shown in step 214.

Referring to FIG. 2B, the algorithm for the private key is explained. Steps 202 through 212 are exactly the same as just described for determining the public key pair (e, n). Because the random number generator is such that given the same seed it generates the same sequence of random numbers, the same p, q and correspondingly, n, are calculated at step 212. Again, the value of n can be calculated at any time after the values of p and q are determined.

To generate the private key, key generator 112 continues (from step 212) in step 216 where it initializes a counter, k. Key generator 112 then calculates the value in step 218. The value d equals the quantity $(k(p-1)(q-1)+1)/e$. (Equation (2) above.) In step 220, key generator 112 determines whether the remainder is zero (0), i.e., whether $(k(p-1)(q-1)+1)$ is evenly divisible by e. Conventionally, e is chosen to be 3 to reduce computational complexity associated with raising quantities to a power, but e can be any desired value. If there is a remainder, then key generator 112 increments the counter, k, by 1 in step 222.

This process, steps 218 through 222 continues until there is no remainder resulting from the division in step 218. When there is no remainder, the private key pair is (n, d) as shown in step 224.

Thus, the public and private keys can be determined algorithmically upon request, based on some unique attribute of the intended recipient. Consequently, it need not be stored, as is required by conventional certificate authorities. As a result, the problems associated with key maintenance and storage that are faced by conventional certificate authorities virtually disappear.

The database of unique attributes already exist. For example, databases of phone numbers of individuals or credit card numbers for individually already exist, and therefore do not need to be recreated.

Figure 2C:
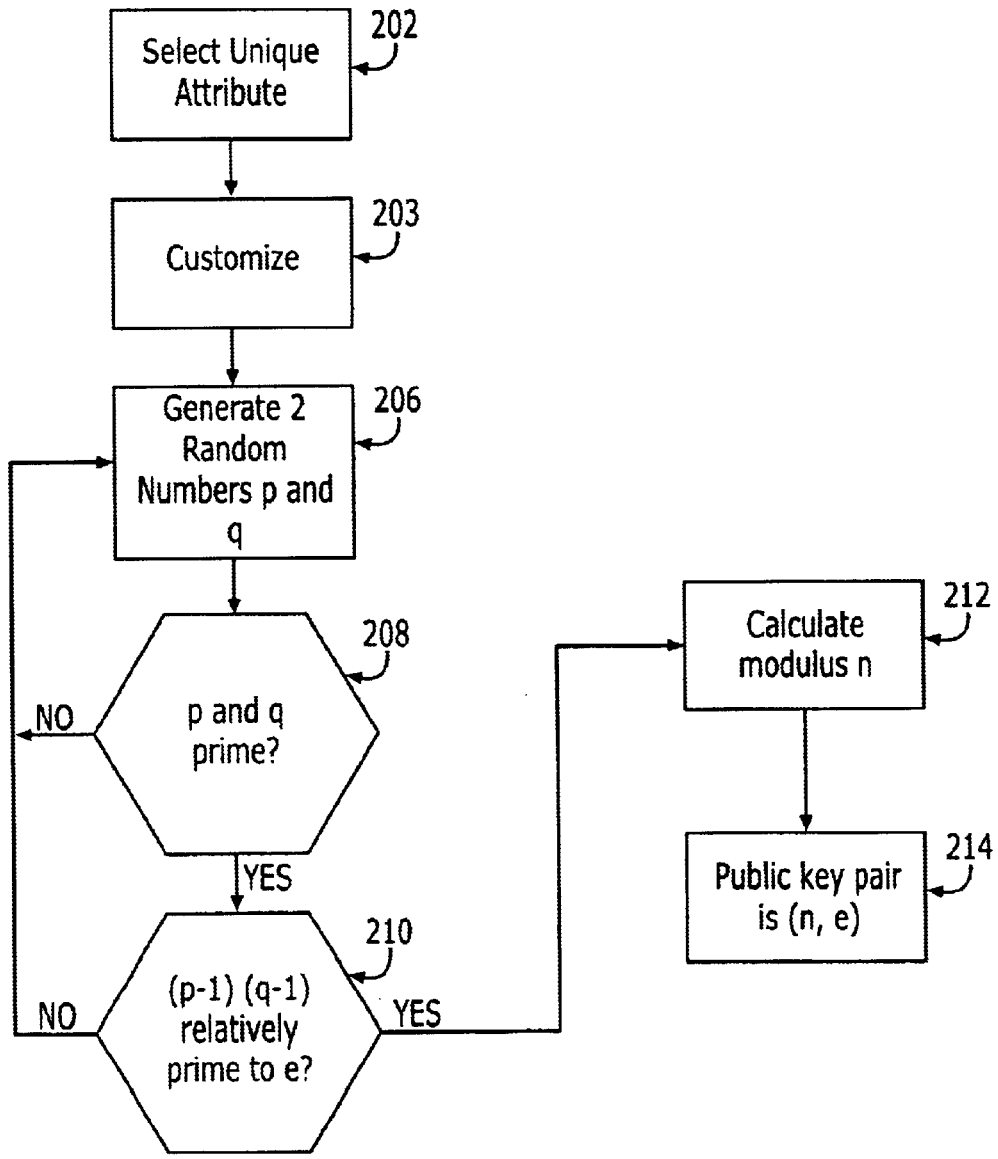
FIG. 2C is a flow chart for deriving a public key according to a second preferred embodiment of the present invention.

FIGS. 2C and 2D are flow charts for a second embodiment of the present invention. In this second embodiment of the present invention, the customization is performed at a different point in the process. FIG. 2C illustrates generation of the public key pair (n, e) according to the second embodiment of the present invention. FIG. 2D illustrates generation of the private key pair (n, d) according to the second embodiment of the present invention.

The majority of the steps illustrated in the flow charts of FIGS. 2C an 2D are identical to those shown in FIGS. 2A and 2B, as indicated by the like numbering. The difference is that the customization is performed in step 203, after the unique attribute is selected in step 202, but prior to generation of the random numbers p and q in step 204. Thus, instead of modifying p and q through substitution or appending of a PIN or some other number, the selected unique attribute is modified prior to submission as a seed value to the random number generator of step 204. Where more than one unique attribute is selected to be used as a seed value, any or all of the unique attributes can be customized. The customization of the unique attribute is performed in a similar manner as described above with respect to customizating the randomly generated values p and q.

Figure 3:
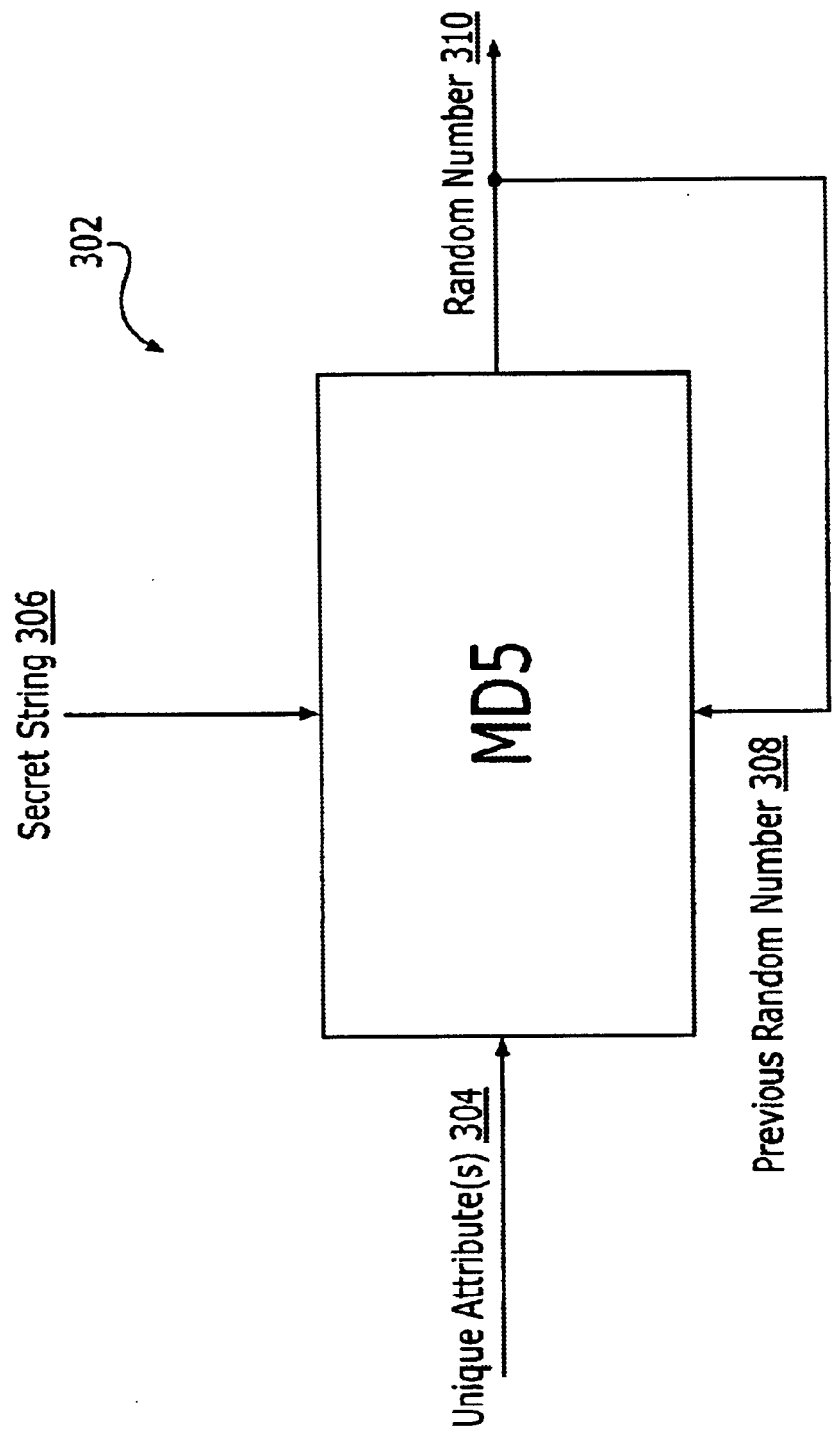
FIG. 3 illustrates schematically a random number generator according to a preferred embodiment of the present invention.

Random number generators which can be used to generate the random numbers required for the present invention are well-known in the art. One that can be used is message-digest 5 (MD5). This algorithm is used to digest or compress long messages in a unique way. Because the outputs the MD5 algorithm produces are unlikely to be the same for any two inputs, it can be used as a random number generator. The MD5 algorithm is described in detail in R. Rivest, "The MD5 Message-Digest Algorithm," ("Rivest") which is incorporated by reference herein in its entirety. Referring to FIG. 3, a particular implementation of the MD5 algorithm is described. The MD5 algorithm executes in an MD5 process 302 as a part of key generator 112, but it would be apparent to those skilled in the art that MD5 process 302 can be implemented in a number of ways within the scope and spirit of the present invention.

As implemented in the preferred embodiment of the present invention, MD5 process 302 has three inputs and produces one output. A unique attribute 304 is one input. Unique attribute 304 is the recipient's phone number, driver's license number, credit card number of other unique identifier. Where more than one unique attribute is used, input 304 is some combination of the selected unique attributes. This combination can be, for example, a concatenation of the various attributes into a single attribute string. As described with respect to FIGS. 2C and 2D, the unique attribute can be customized prior to submission as a seed value to the random number generator. An optional secret string 306 is a second input. Secret string 306 is a key known only to key generator 112. Secret string 306 provides additional security to the key generation process described herein. The third input is the previously generated random number 308. That is, the third input is a feedback of the output to the input. In effect, the three inputs from the single message that the MD5 algorithm digests or compresses to generate the random number. The output is a random number 310. This random number is used as the value for p or q. Random numbers are generated until values for p and q having the required characteristics are generated.

The present invention can also be used for authentication of messages. Authentication is similar to the encryption of messages described above. The sender uses his or her private key to encrypt a short message, known as a digital signature. The sender's private key is obtained from secure message server 108 via a key generation request. Preferably, the sender obtains the private key from a very trusted delivery source, such as the U.S. mail, prior to performing any secure communication. This is safer than sending the private key each time it is required, for example via email in response to a key generation request from the sender to secure message server 108.

The sender transmits the encrypted digital signature to the recipient. Upon receiving the encrypted digital signature, the recipient communicates with secure message server 108 to obtain the sender's public key. As described above with respect to encryption where the sender must send recipient identification information to obtain the recipient's public key, the recipient must send identification information for the sender. Using one or more unique attributes related to the sender identification information, key generator 112 derives the sender's public key and sends it to the recipient. Using the sender's public key, the recipient decrypts the encrypted digital signature. If the resulting plain text digital signature is correct, the message is authentic.

Communication between the sender or recipient and secure message server 108 is carried out in a well-known manner, using well-known network protocols. In a preferred embodiment, communication with secure message server 108 is via the world wide web and occurs either manually (at the request of the sender or recipient) or automatically (via a computer program executing on the sender's or recipient's computer). Communicating the required messages containing the information described above would be apparent to those skilled in the art.

Although the algorithm described above can be used for encrypting the entire message, this is often not done due to the computational time requirements. Instead, the message test is encrypted using a faster encryption scheme, for example, the well-known Data Encryption Standard ("DES"). DES is well-known in the art, and is described, for example, in "Data Encryption Standard (DES)," Federal Information Processing Standards Publication 46-2 (1993), which is hereby incorporated by reference herein in its entirety, including all cross-references cited therein, each of which is hereby incorporated by reference herein in its entirety.

DES requires its own key for decrypting the encrypted message. In a preferred embodiment of the present invention, the message is encrypted using DES and the DES key is encrypted using the public key encryption technique described above. Then both the DES-encrypted message and the public key-encrypted DES key are sent to the recipient. The recipient first uses the public key encryption technique described above to obtain the sender's public key so that the recipient can decrypt the DES key. Using the unencrypted DES key, the recipient decrypts the DES-encrypted message to obtain the plain text that was sent.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. A method of transmitting a secure message from a transmitting device over a network, comprising:
   providing a public key generation request to a secure message server, the public key generation request being associated with a message to be transmitted from the transmitting device and including at least one attribute uniquely associated with a user of an intended receiving device;
   receiving, from the secure message server, a public key associated with the user of the receiving device responsive to the public key generation request associated with the message; and
   encrypting the message using the public key associated with the receiving device.

2. The method of claim 1, further comprising:
   encrypting, at the transmitting device, a signature message using a private key associated with the a user of the transmitting device to provide a digital signature; and
   transmitting the digital signature with the encrypted message to the receiving device.

3. The method of claim 2, wherein the private key associated with the transmitting device is generated by:
   providing a private key generation request to the secure message server, the private key generation request being associated with the message and including at least one attribute uniquely associated with a user of the transmitting device;
   receiving, at the transmitting device, a private key associated with the transmitting device responsive to the private key generation request.

4. The method of claim 1, wherein encrypting further comprises encrypting the message using an RSA algorithm.

5. A method of receiving a secure message at a receiving device over a network, comprising:
   receiving an encrypted message from a transmitting device;
   providing a private key generation request to a secure message server responsive to the received message, the private key generation request being associated with the received message and including at least one attribute uniquely associated with a user of the receiving device;
   receiving, from the secure message server, a private key associated with a user of the receiving device responsive to the private key generation request associated with the receiving message; and
   decrypting the received message using the private key associated with the receiving device.

6. The method of claim 5, wherein receiving an encrypted message further comprises receiving an encrypted digital signature with the encrypted message at the receiving device, the method further comprising:
   providing a public key generation request to a secure message server, the public key generation request being associated with the digital signature and including at least one attribute uniquely associated with a user of the transmitting device;
   receiving, from the secure message server, a public key associated with the transmitting device responsive to the public key generation request associated with the digital signature; and decrypting the digital signature using the public key associated with the transmitting device.

7. The method of claim 5, wherein receiving the private encryption key further comprises receiving the private encryption key in a secure manner.

8. A method of providing public and private keys, comprising:

receiving a key generation request associated with a message, the key generation request including at least one attribute uniquely associated with a user of a device;

generating a public and/or private key associated with the user of the device responsive to the key generation request associated with the message; and providing the public key and/or private key to the device.

9. The method of claim 8, wherein generating the public key comprises:

generating a first random number, p, and a second random number, q, based on the at least one unique attribute, wherein the same first and second random numbers, p and q, are generated each time the same at least one unique attribute is provided in the key generation request;

determining if the first and second random numbers, p and q, are prime numbers;

determining if a quantity, (p−1)(q−1), is relatively prime to a public key exponent, e, if it is determined that the first and second random numbers, p and q, are prime numbers;

calculating a product of the first and second random numbers p and q to provide a modulus, n; and calculating the public key (n,e) based on the modulus, n, and the public key exponent, e.

10. The method of claim 9, further comprising:

generating third and fourth random numbers, p and q, if it is determined that the first and second random numbers are not prime numbers;

determining if the third and fourth random numbers, p and q, are prime numbers; and repeating the generating of random numbers and determining if the random numbers are prime until it is determined that the third and fourth random numbers are prime numbers.

11. The method of claim 9, further comprising:

generating third and fourth random numbers, p and q, if it is determined that the quantity, (p−1)(q−1), is not relatively prime to a public key exponent, e;

determining if the quantity, (p−1)(q−1), is relatively prime to a public key exponent e; and repeating the generating random numbers and determining if the quantity is relatively prime until it is determined that the quantity (p−1)(q−1), is relatively prime to a public key exponent, e.

12. The method of claim 9, wherein generating the private key comprises:

generating a first random number, p, and a second random number, q, based on the at least one unique attribute, wherein the same first and second random numbers, p and q, are generated each time the same at least one unique attribute is provided;

determining if the first and second random numbers, p and q, are prime numbers;

determining if a quantity, (p−1)(q−1), is relatively prime to a public key exponent, e, if it is determined that the first and second random numbers, p and q, are prime numbers;

calculating a product of the first and second random numbers, p and q, to provide a modulus, n;

initializing a counter, k;

calculating a value, d, equal to a quantity, (k(p−1)(q−1)+1/e);

determining if a remainder of the calculation of the value, d, is zero; and calculating the private key (n,d) if the remainder is determined to be zero.

13. The method of claim 12, comprising:

incrementing the counter, k, by 1 if it is determined that the remainder is not zero; and repeating the calculating a value, d, and the determining if remainder is zero until the remainder is determined to be zero.

14. The method of claim 9, wherein generating the public key further comprises:

associating a PIN with the user of the receiving device; and generating the public key based on the PIN associated with the user of the receiving device.

15. The method of claim 9, wherein generating the public key further comprises:

associating a password with a user of the receiving device; and generating the public key based on the password associated with the user of the receiving device.

16. The method of claim 9, wherein receiving a key generation request is followed by searching a database using the at least one attribute uniquely associated with a user of the receiving device to obtain information that can be used to identify the user of the receiving device.

17. A transmitting device configured to transmit a secure message over a network, comprising:

a first circuit configured to provide a public key generation request to a secure message server, the public key generation request being associated with a message to be transmitted from the transmitting device and including at least one attribute uniquely associated with a user of an intended receiving device;

a second circuit configured to receive, from the secure message server, a public key associated with the user of the receiving device responsive to the public key generation request associated with the message; and encryption circuit configured to encrypt the message using the public key associated with the receiving device.

18. The device of claim 17, wherein the encryption circuit is further configured to encrypt a signature message using a private key associated with the a user of the transmitting device to provide a digital signature and wherein the first circuit is further configured to transmit the digital signature with the encrypted message to the receiving device.

19. The device of claim 18, wherein the first circuit is further configured to provide a private key generation request to the secure message server, the private key generation request being associated with the message and including at least one attribute uniquely associated with a user of the transmitting device and wherein the second circuit is further configured to receive a private key associated with the transmitting device responsive to the private key generation request.

20. A receiving device for receiving a secure message over a network, comprising:

a first circuit configured to receive an encrypted message from a transmitting device;

a second circuit configured to provide a private key generation request to a secure message server responsive to the received message, the private key generation request being associated with the received message and including at least one attribute uniquely associated with a user of the receiving device, the first circuit further configured to receive, from the secure message server, a private key associated with a user of the receiving device responsive to the private key generation request associated with the receiving message; and a decryption circuit configured to decrypt the received message using the private key associated with the receiving device.

21. The device of claim 20, wherein the first circuit is further configured to receive an encrypted digital signature with the encrypted message, provide a public key generation request to a secure message server, the public key generation request being associated with the digital signature and including at least one attribute uniquely associated with a user of the transmitting device and receive, from the secure message server, a public key associated with the transmitting device responsive to the public key generation associated with the digital signature; and wherein the decryption circuit is further configured to decrypt the digital signature using the public key associated with the transmitting device.

22. A serve device for providing public and private keys, comprising:

a first circuit configured to receive a key generation request associated with a message, the key generation request including at least one attribute uniquely associated with a user of a device;

a key generator configured to generate a public and/or private key associated with the user of the device responsive to the key generation request associated with the message; and a second circuit configured to provide the public key and/or private key to the device.

23. The device of claim 22, wherein the key generator is further configured to:

generate a first random number, p, and a second random number, q, based on the at least one unique attribute, wherein the same first and second random numbers, p and q, are generated each time the same at least one unique attribute is provided in the key generation request;

determining if the first and second random numbers, p and q, are prime numbers;

determine if a quantity, (p−1)(q−1), is relatively prime to a public key exponent, e, if it is determined that the first and second random numbers, p and q, are prime numbers;

calculate a product of the first and second random numbers p and q to provide a modulus, n; and calculate the public key (n,e) based on the modulus, n, and the public key exponent, e.

24. The device of claim 23, wherein the key generator is further configured to:

generate third and fourth random numbers, p and q, if it is determined that the first and second random numbers are not prime numbers;

determine if the third and fourth random numbers, p and q, are prime numbers; and repeat the generating of random numbers and determining if the random numbers are prime until it is determined that the third and fourth random numbers are prime numbers.

25. The device of claim 23, wherein the key generator is further configured to:

generate third and fourth random numbers, p and q, if it is determined that the quantity, (p−1)(q−1), is not relatively prime to a public key exponent, e;

determine if the quantity, (p−1)(q−1), is relatively prime to a public key exponent e; and repeat the generating random numbers and determining if the quantity is relatively prime until it is determined that the quantity, (p−1)(q−1), is relatively prime to a public key exponent, e.

26. The device of claim 22, wherein the key generator is further configured to:

generate a first random number, p, and a second random number, q, based on the at least one unique attribute, wherein the same first and second random numbers, p and q, are generated each time the same at least one unique attribute is provided;

determining if the first and second random numbers, p and q, are prime numbers;

determining if a quantity, (p−1)(q−1), is relatively prime to a public key exponent, e, if it is determined that the first and second random numbers, p and q, are prime numbers;

calculate a product of the first and second random numbers, p and q, to provide a modulus, n;

initialize a counter, k;

calculate a value, d, equal to a quantity, (k(p−1)(q−1)+1/e);

determine if a remainder of the calculation of the value, d, is zero; and calculate the private key (n,d) if the remainder is determined to be zero.

27. The device of claim 26, comprising:

incrementing the counter, k, by 1 if it is determined that the remainder is not zero; and repeating the calculating a value, d, and the determining if remainder is zero until the remainder is determined to be zero.

28. A computer program product for transmitting a secure message from a transmitting device over a network, the computer program product comprising:

a computer readable storage medium having computer readable program code embodied in said medium, said computer readable program code comprising:

computer readable program code configured to provide a public key generation request to a secure message server, the public key generation request being associated with a message to be transmitted from the transmitting device and including at least one attribute uniquely associated with a user of an intended receiving device;

computer readable program code configured to receive, from the secure message server, a public key associated with the user of the receiving device responsive to the public key generation request associated with the message; and computer readable program code configured to encrypt the message using the public key associated with the receiving device.

29. A computer program product for receiving a secure message at a receiving device over a network, the computer program product comprising: the computer program product comprising:

a computer readable storage medium having computer readable program code embodied in said medium, said computer readable program code comprising:

computer readable program code configured to receive an encrypted message from a transmitting device;

computer readable program code configured to provide a private key generation request to a secure message server responsive to the received message, the private key generation request being associated with the receiving message and including at least one attribute uniquely associated with a user of the receiving device;

computer readable program code configured to receive, from the secure message server, a private key associated with a user of the receiving device responsive to the private key generation request associated with the received message; and computer readable program code configured to decrypt the received message using the private key associated with the receiving device.

30. A computer program product for providing public and private keys, the computer program product comprising: the computer program product comprising:

a computer readable storage medium having computer readable program code embodied in said medium, said computer readable program code comprising:

computer readable program code configured to receive a key generation request associated with a message, the key generation request including at least one attribute uniquely associated with a user of a device;

computer readable program code configured to generate a public and/or private key associated with the user of the device responsive to the key generation request associated with the message; and computer readable program code configured to provide the public key and/or private key to the device.

31. The computer program product of claim 30, wherein the computer readable program code configured to generate the public key comprises:

computer readable program code configured to generate a first random number, p, and a second random number, q, based on the at least one unique attribute, wherein the same first and second random numbers, p and q, are generated each time the same at least one unique attribute is provided in the key generation request;

computer readable program code configured to determine if the first and second random numbers, p and q, are prime numbers;

computer readable program code configured to determine if a quantity, $(p-1)(q-1)$, is relatively prime to a public key exponent, e, if it is determined that the first and second random numbers, p and q, are prime numbers;

computer readable program code configured to calculate a product of the first and second random numbers p and q to provide a modulus, n; and computer readable program code configured to calculate the public key (n,e) based on the modulus, n, and the public key exponent, e.

32. The computer program product of claim 29, wherein generating the private key comprises:

computer readable program code configured to generate a first random number, p, and a second random number, q, based on the at least one unique attribute, wherein the same first and second random numbers, p and q, are generated each time the same at least one unique attribute is provided;

computer readable program code configured to determine if the first and second random numbers, p and q, are prime numbers;

computer readable program code configured to determine if a quantity, $(p-1)(q-1)$, is relatively prime to a public key exponent, e, if it is determined that the first and second random numbers, p and q, are prime numbers;

computer readable program code configured to calculate a product of the first and second random numbers, p and q, to provide a modulus, n;

computer readable program code configured to initialize a counter, k;

computer readable program code configured to calculate a value, d, equal to a quantity, $(k(p-1)(q-1)/+1/e)$;

computer readable program codec configured to determine if a remainder of the calculation of the value, d, is zero; and computer readable program code configured to calculate the private key (n,d) if the remainder is determined to be zero.

* * * * *

UNITED STATES PATENT AND TRADEMARK OFFICE
CERTIFICATE OF CORRECTION

| | |
|---|---|
| PATENT NO. | : 6,868,160 B1 |
| APPLICATION NO. | : 09/435771 |
| DATED | : March 15, 2005 |
| INVENTOR(S) | : A. Raji |

It is certified that error appears in the above-identified patent and that said Letters Patent is hereby corrected as shown below:

On the Title Page:

Title in item 54 on Title Page and Colm. 1, lines 1-2: should read., --METHODS, SYSTEMS AND COMPUTER PROGRAM PRODUCTS FOR PROVIDING SECURE SHARING OF ELECTRONIC DATA--

Signed and Sealed this

Twenty-seventh Day of January, 2009

JOHN DOLL
*Acting Director of the United States Patent and Trademark Office*